United States Patent [19]
Howie, Jr.

[11] Patent Number: 5,675,867
[45] Date of Patent: Oct. 14, 1997

[54] COMPOSITE METAL AND PLASTIC HANDLE

[75] Inventor: Robert K. Howie, Jr., Decatur, Ill.

[73] Assignee: The Grigoleit Company, Decatur, Ill.

[21] Appl. No.: 435,581

[22] Filed: May 5, 1995

[51] Int. Cl.$^6$ ........................................ A47B 95/02
[52] U.S. Cl. ........................ 16/111 R; 16/124; 49/460
[58] Field of Search .......................... 16/110 R, 124, 16/DIG. 12, 111 R, DIG. 18, DIG. 19, 125, 116 R, 119; 190/115; 312/139, 244; 49/460

[56] References Cited

U.S. PATENT DOCUMENTS

| | | | |
|---|---|---|---|
| 936,802 | 10/1909 | Ohnstrand | 16/125 |
| 1,008,604 | 11/1911 | Lake | 16/DIG. 12 |
| 1,202,433 | 10/1916 | Rubinstein | 16/110 R |
| 1,207,318 | 12/1916 | Parkes | 16/125 |
| 2,578,230 | 12/1951 | Davis | 16/116 R |
| 2,595,695 | 5/1952 | Packer et al. | 16/125 |
| 2,673,630 | 3/1954 | Axtell | 16/112 |
| 4,576,207 | 3/1986 | Levine et al. | 16/110 R |
| 5,303,451 | 4/1994 | Graviss et al. | 16/125 |

FOREIGN PATENT DOCUMENTS 2616832  12/1988  France ..................... 16/110 R Primary Examiner—Daniel W. Howell
Assistant Examiner—Donald M. Gurley
Attorney, Agent, or Firm—Dorn, McEachran, Jambor & Keating

[57] ABSTRACT

A composite handle for a household appliance having a hollow metal core and an outer covering of a thermoplastic which covering may be soft or hard. The hollow metal core includes a hollow tubular center portion and flattened, channel-shaped legs and feet extending from opposite ends of the center portion. The thermoplastic outer covering forms a relatively thin coating on the front face of the tubular center portion of the core and thicker coatings on the rear face of the tubular center portion of the core and the front face of the legs and feet.

2 Claims, 2 Drawing Sheets

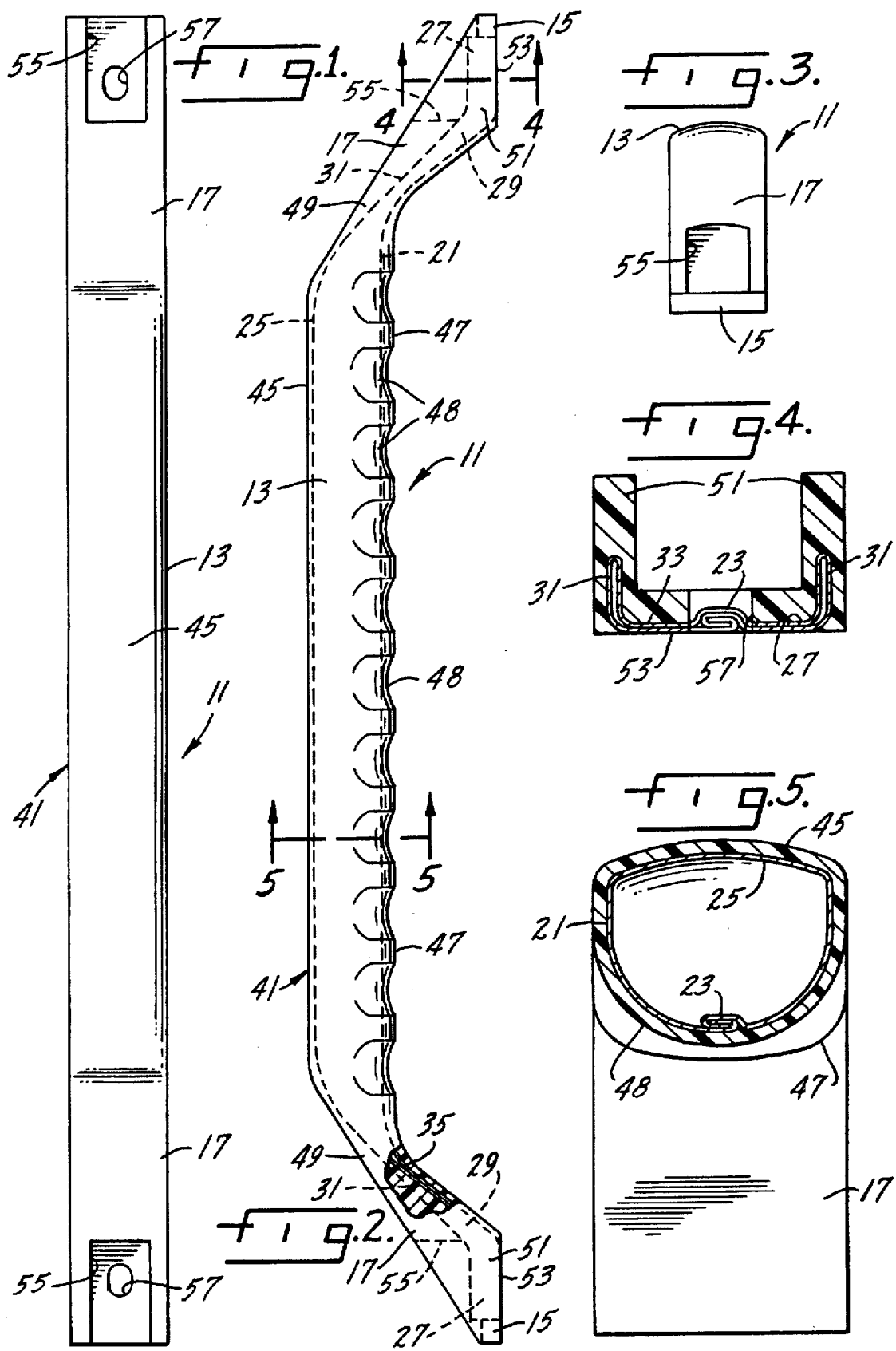

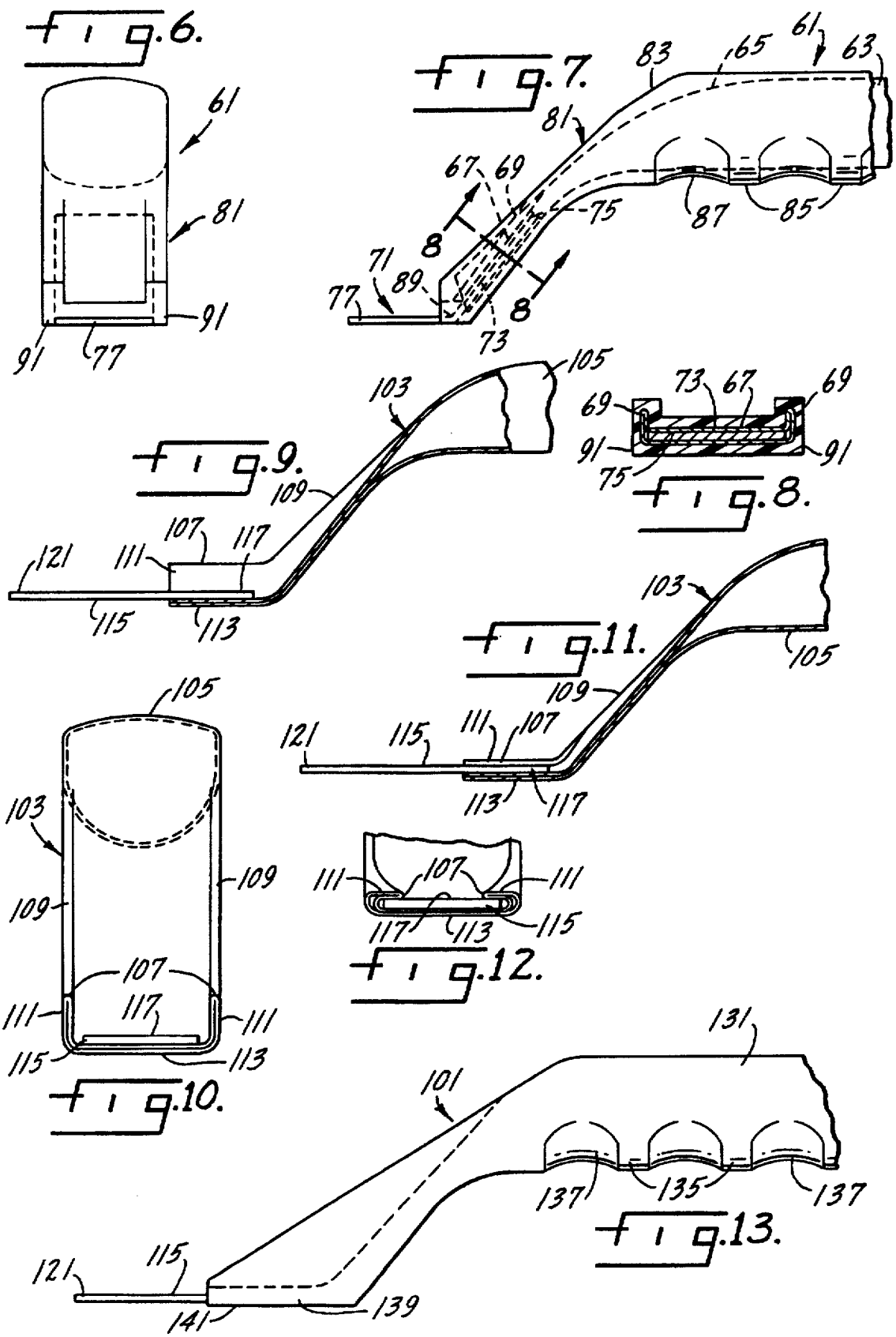

COMPOSITE METAL AND PLASTIC HANDLE

BACKGROUND AND SUMMARY OF THE INVENTION

Handles of household refrigerators are frequently manufactured so that they have a "soft" touch or feel. This has been accomplished by the injection molding of a relatively thick covering of an elastomer around a channel-shaped stiffener, usually made of metal, to form a handle having an offset center gripping portion which is "soft" to the user's touch or feel. Such handles are expensive to manufacture. A relatively large amount of relatively expensive elastomer must be molded around the stiffener to provide the requisite "soft" touch or feel because the stiffener's transverse cross section is small relative to the similar cross section of the handle.

A similar problem exists in the manufacture of a like handle having a "hard" covering. The terms "soft" and "hard" when used to describe a handle covering formed of a thermoplastic material do not admit easily to absolute definition except as measured by the subjective reaction of a user. A typical user will know immediately upon touching a handle whether its covering is "soft" or "hard" although the user will not be able to define the parameters of either condition. Accordingly, the terms "soft" and "hard" as used in this specification are defined by the reaction to touch which will be evoked in a typical user.

It is an object of this invention to provide a handle for a household refrigerator or other appliance which has a "soft" touch or feel to the user while requiring substantially less plastic and less metal in its construction than is found in presently available handles.

Another object of this invention is a handle for a household refrigerator or other appliance having a hollow tubular metal core of relatively large transverse cross section at its offset center gripping portion and an outer coating of a thermoplastic having a relatively thin transverse cross section around this portion of the handle.

Yet another object of this invention is a household appliance handle having a hollow tubular metal core whose ends are flattened into inclined legs and feet of U-shaped cross section to offset the tubular center portion of the handle from the appliance door and to provide attachment feet for mounting the handle to the appliance door.

Still another object of this invention is a household appliance handle having a central offset gripping portion formed of a hollow tubular metal core, a thin outer coating of a thermoplastic on the front face of the handle and a thicker coating of the thermoplastic applied in ridges to the rear face of the handle to form finger grips.

A further object of this invention is an appliance handle having mounting feet that are attached to the handle through crimping to the core of the appliance handle.

Yet a further object of this invention is a plastic covered appliance handle having a hollow metal core which core can be fitted with mounting feet of various lengths and configurations.

Other objects of the invention may be found in the following specification, claims and drawings.

BRIEF DESCRIPTION OF THE DRAWINGS

The invention is illustrated more or less diagrammatically in the following drawings wherein:

FIG. 1 is a front elevational view of one embodiment of the handle of this invention;

FIG. 2 is a side elevational view of the handle of FIG. 1 with hidden parts shown in dashed lines and with a portion of the handle covering broken away;

FIG. 3 is an end elevational view of the handle of FIG. 1;

FIG. 4 is an enlarged cross sectional view taken along line 4—4 of FIG. 2;

FIG. 5 is an enlarged cross sectional view taken along line 5—5 of FIG. 2;

FIG. 6 is an end view of a modified composite handle of this invention with some hidden parts shown in dashed lines;

FIG. 7 is a partial side elevational view of the handle of FIG. 6 with some parts broken away and some hidden parts shown in dashed lines;

FIG. 8 is an enlarged cross sectional view taken along line 8—8 of FIG. 7;

FIG. 9 is a partial side elevational view of another modified core of a handle of this invention, with some portions broken away, showing the positioning of a mounting plate before it is connected to the handle;

FIG. 10 is an end view of the handle core of FIG. 9 with some hidden parts shown in dashed lines;

FIG. 11 is a partial side elevational view similar to FIG. 9 but showing the mounting plate crimped to the handle;

FIG. 12 is a partial end view of the core of FIG. 11; and

FIG. 13 is a partial side elevational view of a handle incorporating the modified core of FIG. 11 with some hidden parts shown in dashed lines.

DESCRIPTION OF THE PREFERRED EMBODIMENTS

FIGS. 1–5 of the drawings show one embodiment of a composite handle 11 having a central gripping portion 13 that is offset from feet 15 which mount the handle on the front face of a door of an appliance such as a refrigerator. The feet are connected to the offset center gripping portion of the handle 13 by inclined legs 17.

As is most clearly shown in FIGS. 2–5 of the drawings, the handle 11 includes a metal core 21 which is formed of sheet metal bent into a hollow tubular member having a longitudinally extending interlocking seam 23. The metal core 21 is formed with a hollow tubular center portion 25 and flattened, channel-shaped feet 27 at the ends thereof which are connected to the hollow tubular center portion 25 by inclined legs 29 also of flattened, channel-shaped cross section. As can be seen most clearly in FIGS. 2 and 4 of the drawings, the sides 31 of the channel-shaped feet 27 and legs 29 face forwardly. The sides 31 of the channels are separated by a base 33 which extends from the feet 27 through the legs 29 to the mergers at 35 between the flattened channel-shape legs 29 of the core and the hollow tubular center portion 25 of the core.

An injection molded thermoplastic forms an outer covering 41 around the metal core 21. The thermoplastic selected for a handle having a particular application will determine whether the handle will be considered as presenting a "soft" touch or a "hard" touch to a typical user. A thermoplastic of the type which will evoke a "soft" touch in a user is polyvinyl-chloride. Typical thermoplastics capable of providing a "hard" touch or feel are ABS and nylon. The outer covering 41 is molded so as to be relatively thin where it covers the tubular center portion 25 of the core on the front facing surface 45 of the handle and to be thicker so as to form lands 47 on the reverse side of the handle. The lands 47 define gripping notches 48 between them for the offset center portion 13 of the handle. The outer covering 41 is made thicker at 49 to encapsulate the core legs and at 51 to surround the core feet 27 with a minimum or no covering on the bottoms 53 of the core feet 27 which mount against the front face of the appliance door. A portion of the thicker outer covering 51 is notched at 55 to provide access to openings 57 extending through the base 33 of the channel to provide passage for fasteners (not shown) which will be used to attach the handle to an appliance door.

The provision of a thin-walled hollow metal core 21 as the reinforcing for the handle 11 provides strength while also reducing the amount of thermoplastic covering 41 that must be provided to give the handle a "soft" feel or touch. This "soft" feel is enhanced by the use of a hollow metal core 21 with a tubular center 25 upon which the finger gripping notches 48 are formed between the thickened lands or ridges 47 on the rear face of the handle. Thus, in this construction, most of the volume of the handle 11 is taken up by air space in the hollow tubular center portion 25 of the core 21 thereby reducing the amount of soft thermoplastic material required to form the outer covering 41. In the same manner, this invention reduced the amount of hard thermoplastic material required to form the outer covering when a "hard" touch or feeling is desired. This invention also permits the thickening of the outer covering encapsulating the core legs 29 and feet 27 to provide a substantial appearance to the entire handle. Although the thin-walled hollow metal core 21 is shown and described as formed of sheet metal bent into a hollow tubular member having a longitudinally extending interlocking seam 23, it should be understood and appreciated that the core 21 may be formed from seamless tubing. It should also be understood that the integral feet 27 may be omitted from the core 21 and separate plates may be provided at opposite ends of the hollow tubular center portion 25 to provide feet to support the handle on an appliance door.

FIGS. 6–8 of the drawings show a modification of the invention embodied in a handle 61 which includes a metal core 63 formed of seamless tubing and having a hollow tubular center portion 65. In this embodiment of the invention, the hollow metal core has inclined legs 69 of flattened channel shape but does not have integral feet. Instead, the feet for the handle are each formed as part of a bent plate 71 which has an inclined portion 73 which fits into a slot 75 of rectangular cross section formed in the inclined legs 67 and a foot portion 77 formed integrally with the inclined portion 73.

An injection molded thermoplastic forms an outer covering 81 around the metal core 63, the inclined portion 73 of the plate 71 and a portion of the foot portion 77. This outer covering is molded so that it is relatively thin where it covers the tubular center portion 65 of the core on the front facing surface 83 and is thicker forming lands or projections 85 on the reverse or rearwardly facing side of the handle. The lands 85 defined gripping notches 87 between them for the offset center portion 65 of the handle. The plastic covering 81 also covers a small portion of the mounting foot 77 of the plate 71 for a short distance outwardly of the bend 89 in the plate 71. The thermoplastic covers the outer edges of a portion of the plate 71 at 91 as shown in FIGS. 6, 7 and 8 of the drawings.

Yet another embodiment of the invention is shown in FIGS. 10–13 of the drawings. In this embodiment of the invention, plates are used but the hollow core also has feet to which the plates are attached. In this modification, the handle 101 includes a core 103 of hollow metal seamless tubing. The core includes a hollow tubular center portion 105, channel shaped feet 107, and inclined legs 109 connecting the feet to the tubular center portion 105.

As can be best seen in FIGS. 9 and 10 of the drawings, the channel shaped feet 107 and inclined legs 109 are formed of two thicknesses of metal bent into a channel having side walls 111 on opposite sides of a base 113 with the channel opening in the forwardly facing direction of the handle 101. A plate 115 in the shape of a flat elongated rectangular piece of metal has a portion 117 which rests in a channel shaped foot 107 on the base 113. The opposite end 121 of the plate 115 forms the portion used for mounting the handle 101 to an appliance door such as a refrigerator. As best shown in FIGS. 11, 12 and 13 of the drawings, the side walls 111 of the feet 107 and legs 109 are bent over the end portion 117 of the plate 115 to fasten the plate to the handle 101.

An injection molded thermoplastic forms an outer covering 131 around the metal core 103. This outer covering is molded so that it is relatively thin where it covers the tubular center portion 105 of the core on the front facing surface of the handle and is thicker forming lands or ridges 135 on the reverse side of the handle. The lands or ridges 135 create gripping notches 137 between them for the offset center portion 105 of the handle. The outer covering 131 is thickened at 139 to encapsulate the bent over side walls 111 of the feet 107 and the inclined legs 109 of the metal core 103. The outer covering terminates at the ends of the core legs 107 so that it does not encapsulate the mounting end 121 of the plates 115. The outer covering forms a sole 141 under the inwardly facing bottoms of the plates 115.

I claim:

1. A composite handle including:
   a thin walled, elongated metal tubular member having opposite ends,
   an outer covering of a thermoplastic molded to said tubular member to form a seamless covering encapsulating said tubular member,
   inclined legs formed at said opposite ends of said tubular member, feet formed integrally with said inclined legs with said feet extending generally parallel to said tubular member, and
   an elongated plate attached to each foot to provide mounts for said handles.

2. The composite handle of claim 1 in which said elongated flat plates are attached to said feet by squeezing said feet to said plates.

* * * * *